(12) United States Patent
Ottolini et al.

(10) Patent No.: US 10,822,861 B2
(45) Date of Patent: Nov. 3, 2020

(54) GLOVE BOX ACTUATOR FOR POWER CINCHING AND POWER RELEASE

(71) Applicant: Inteva Products, LLC, Troy, MI (US)

(72) Inventors: Philippe Ottolini, La Voivre (FR); Mathias Barth, Azerailles (FR)

(73) Assignee: INTEVA PRODUCTS, LLC, Troy, MI (US)

( * ) Notice: Subject to any disclaimer, the term of this patent is extended or adjusted under 35 U.S.C. 154(b) by 127 days.

(21) Appl. No.: 16/186,229

(22) Filed: Nov. 9, 2018

(65) Prior Publication Data

US 2019/0153769 A1 May 23, 2019

(30) Foreign Application Priority Data

Nov. 20, 2017 (FR) ..................... 17 60910

(51) Int. Cl.
*E05F 15/70* (2015.01)
*B60R 7/06* (2006.01)

(52) U.S. Cl.
CPC ............... *E05F 15/70* (2015.01); *B60R 7/06* (2013.01); *E05Y 2201/722* (2013.01); *E05Y 2400/32* (2013.01); *E05Y 2400/44* (2013.01); *E05Y 2900/538* (2013.01)

(58) Field of Classification Search
CPC ........ E05F 15/70; B60R 7/06; E05Y 2400/44; E05Y 2900/538; E05Y 2400/32; E05Y 2201/722
USPC .................................................... 296/37.12
See application file for complete search history.

(56) References Cited

U.S. PATENT DOCUMENTS

| | | | | |
|---|---|---|---|---|
| 7,121,605 B2* | 10/2006 | DePue | ..................... | B60R 7/06 296/37.12 |
| 7,500,704 B2* | 3/2009 | Herrera | ..................... | B60R 7/06 296/37.12 |
| 8,172,297 B2* | 5/2012 | Rhee | ..................... | B60R 7/06 296/24.34 |
| 8,840,165 B2* | 9/2014 | Park | ..................... | B60R 7/06 296/37.12 |
| 8,991,891 B2* | 3/2015 | Bohnenberger | ..................... | B60R 7/06 296/37.12 |
| 9,566,912 B2* | 2/2017 | Shami | ..................... | B60R 7/06 |
| 10,316,554 B2* | 6/2019 | Ben Abdelaziz | ..................... | E05B 81/70 |
| 2019/0153769 A1 | 5/2019 | Ottolini et al. | | |

FOREIGN PATENT DOCUMENTS

| | | |
|---|---|---|
| CN | 206205622 U | 5/2017 |
| EP | 2848840 A1 | 3/2015 |

OTHER PUBLICATIONS

Chinese Office Action; International Application No. 201811375092.6; International Filing Date: Nov. 19, 2018; dated May 26, 2020; 10 pages.

* cited by examiner

*Primary Examiner* — Pinel E Romain
(74) *Attorney, Agent, or Firm* — Cantor Colburn LLP

(57) ABSTRACT

An actuation system (18) of a glove box assembly (10) includes a drive system (21) and at least one rack (20) driven by the drive system (21) between a closed position, an open position, and a pre-closed position. At least one switch (56, 62) senses a position of the at least one rack (20). The drive system (21) is operable in response to a signal output by the at least one switch (56, 62).

19 Claims, 16 Drawing Sheets

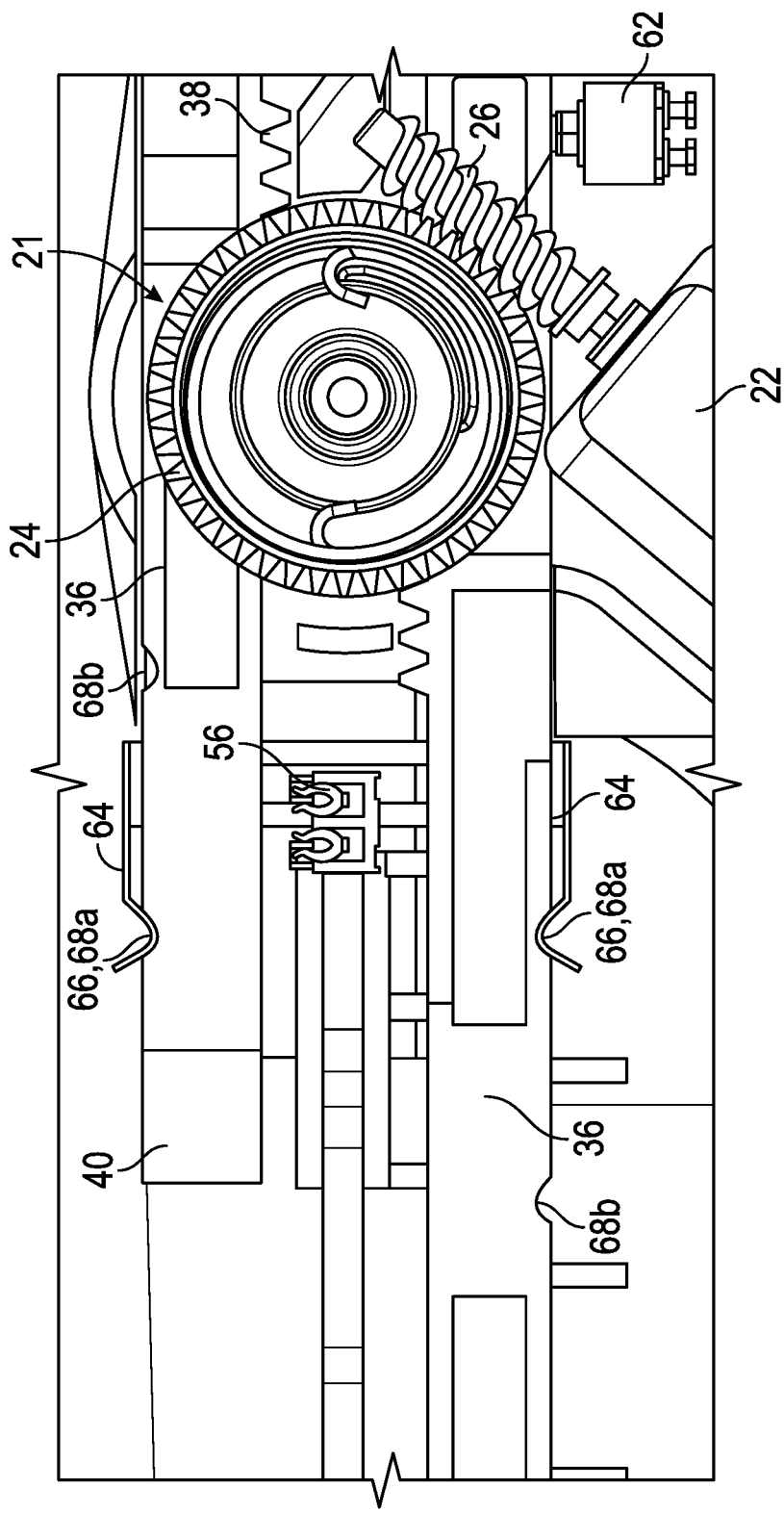

GLOVE BOX ACTUATOR FOR POWER CINCHING AND POWER RELEASE

CROSS-REFERENCE TO RELATED APPLICATIONS

This application claims the benefit of France Application No. 17/60910, filed Nov. 20, 2017, which is incorporated herein by reference in its entirety.

TECHNICAL FIELD

Exemplary embodiments of the present disclosure relative to door and movable panel latches, and more particularly to glove box door latches for vehicles.

BACKGROUND

Conventional means for operating a vehicle glove box typically include a purely mechanical device, with either a simple single retracting pawl or a more modem. dual side pawl design. An electromechanical means for opening and closing the glove box door will allow for more freedom in the styling of the glove box door or panel.

SUMMARY OF THE INVENTION

According to an embodiment, an actuation system (18) of a glove box assembly (10) includes a drive system (21) and at least one rack (20) driven by the drive system (21) between a closed position, an open position, and a pre-closed position. At least one switch (56, 62) senses a position of the at least one rack (20). The drive system (21) is operable in response to a signal output by the at least one switch (56, 62).

In addition to one or more of the features described above, or as an alternative, in further embodiments the at least one rack (20) further comprises a rack end (42) movably mounted to a distal end (46) of the at least one rack (20).

In addition to one or more of the features described above, or as an alternative, in further embodiments comprising an engagement feature (52) associated with the rack end (42), wherein the at least one switch (56, 62) is activatable by the engagement feature (52).

In addition to one or more of the features described above, or as an alternative, in further embodiments the engagement feature (52) extends from the rack end (42).

In addition to one or more of the features described above, or as an alternative, in further embodiments the at least one rack (20) further comprises a link (58) coupled to the rack end (42), the engagement feature (52) being formed on the link (58).

In addition to one or more of the features described above, or as an alternative, in further embodiments the at least one switch (56, 62) includes a first switch (62) for determining if the at least one rack (20) is not in the closed position and a second switch (56) for detecting when the glove box assembly (10) is in the pre-closed position.

According to another embodiment, a glove box assembly (10) includes a housing (12) defining a compartment (14), and a lid (16) movably coupled to the housing (12) to selectively seal the compartment (14). An actuation system (18) is associated with the lid (16) and is operable to automatically cinch the lid (16) closed when the lid (16) is in a pre-closed position relative to the housing (12).

In addition to one or more of the features described above, or as an alternative, in further embodiments the actuation system (18) further comprises a drive system (21), at least one rack (20) connected to the drive system (21), the at least one rack (20) being movable relative to the lid (16) to selectively engage the housing (12), and at least one switch (56, 62) for determining a position of the lid (16) relative to the housing (12).

In addition to one or more of the features described above, or as an alternative, in further embodiments the at least one switch (56, 62) is operable to monitor a position of the at least one rack (20) to determine when the at least one rack (20) is in a closed position.

In addition to one or more of the features described above, or as an alternative, in further embodiments the at least one switch (56, 62) is operable to monitor a movement of the at least one rack (20) to determine when the glove box assembly (10) is in the pre-closed position.

In addition to one or more of the features described above, or as an alternative, in further embodiments the at least one rack (20) further comprises a rack end (42) movably mounted to a distal end (46) of the at least one rack (20).

In addition to one or more of the features described above, or as an alternative, in further embodiments comprising a biasing mechanism (48) coupled to the rack end (42) to bias the rack end (42) toward the housing (12).

In addition to one or more of the features described above, or as an alternative, in further embodiments comprising an engagement feature (52) associated with the rack end (42), wherein the at least one switch (56, 62) is activatable by the engagement feature (52).

According to yet another embodiment, a method of closing a glove box lid (16) includes manually rotating a glove box lid (16) to a pre-closed position relative to a housing (12), activating a switch (56) of a glove box actuation system (18) associated with the glove box lid (16), and automatically translating at least one rack (20) of the glove box actuation system (18) from a pre-closed position to a closed position in response to activating the switch (56). In the closed position, the at least one rack (20) extending from the glove box lid (16) is engaged with the housing (12).

In addition to one or more of the features described above, or as an alternative, in further embodiments manually rotating the glove box lid (16) selectively opposes a biasing force acting on a rack end (42) mounted to the at least one rack (20).

In addition to one or more of the features described above, or as an alternative, in further embodiments selectively opposing the biasing force acting on the rack end (42) sequentially activates and deactivates the switch (56).

In addition to one or more of the features described above, or as an alternative, in further embodiments activating the switch (56) further comprises communicating an output signal from the switch (56) to a drive system (21) coupled to the at least one rack (20).

In addition to one or more of the features described above, or as an alternative, in further embodiments comprising automatically translating the at least one rack (20) from a closed position to an open position in response to activation of another switch (62).

In addition to one or more of the features described above, or as an alternative, in further embodiments automatically translating the at least one rack (20) from a closed position to an open position causes the glove box lid (16) to move open relative to the housing (12).

In addition to one or more of the features described above, or as an alternative, in further embodiments when the at least one rack (20) is in the open position, a biasing force biases the at least one rack (20) to a pre-closed positon.

In addition to one or more of the features described above, or as an alternative, in further embodiments at least a portion of the glove box actuation system (18) is located separate from the glove box lid.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which:

FIGS. 15A and 15B are schematic illustrations of an indexing spring of the drive system according to an embodiment.

DETAILED DESCRIPTION

Figure 1:
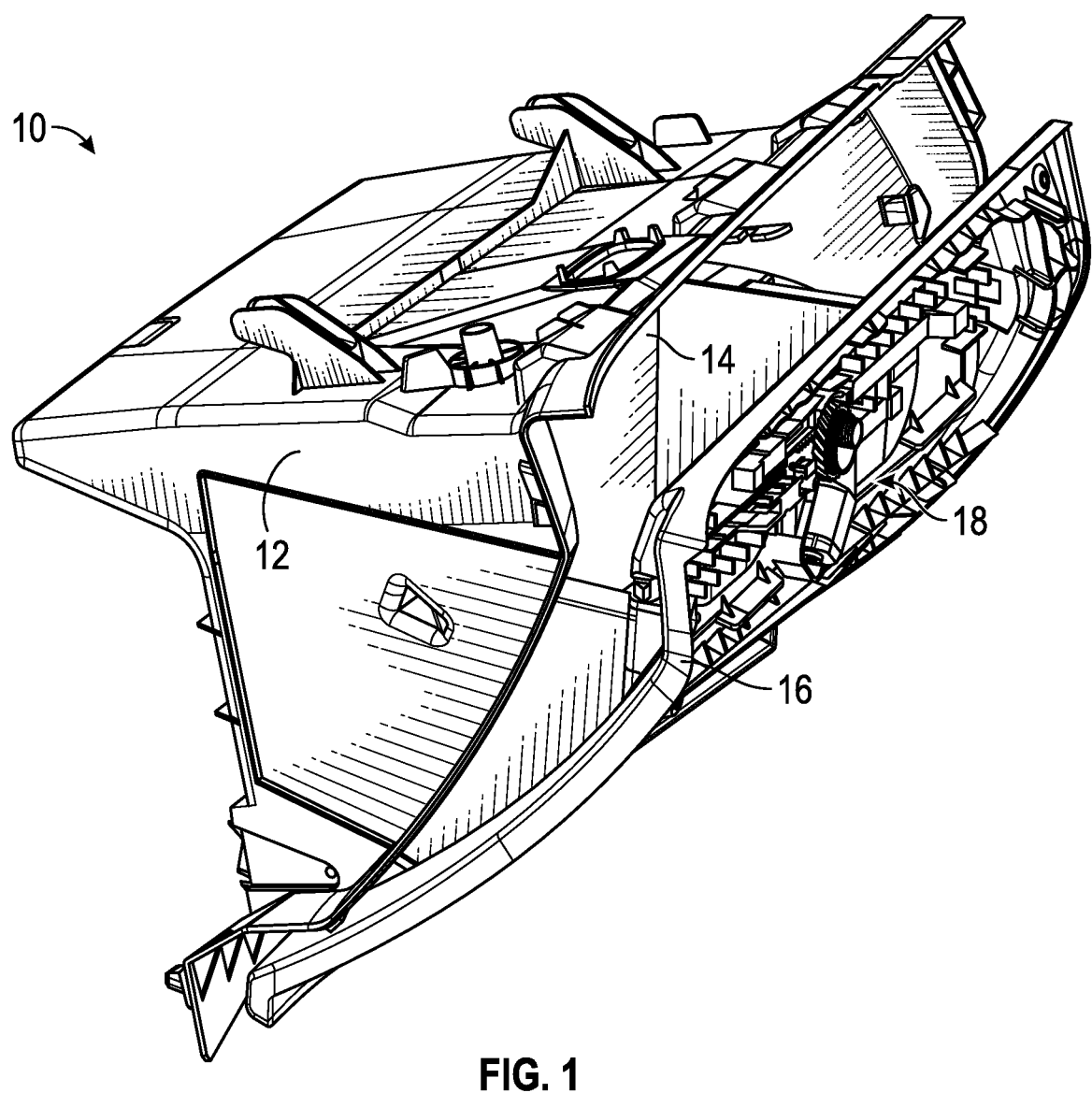
FIG. 1 is a perspective view of a glove box assembly in an open configuration according to an embodiment.

Referring now to FIG. 1, an example of a glove box assembly 10 is illustrated. The glove box assembly 10 includes a glove box housing 12 having a generally hollow interior or compartment 14. A glove box door or lid 16 coupled to the glove box housing 12 is rotatable to selectively seal the hollow interior 14 of the housing 12. In an embodiment, the glove box assembly 10 includes a glove box actuation system 18 for moving a rack 20 (see FIG. 2) coupled to the glove box lid 16 into and out of engagement with a corresponding portion of the glove box housing 12.

Figure 2:
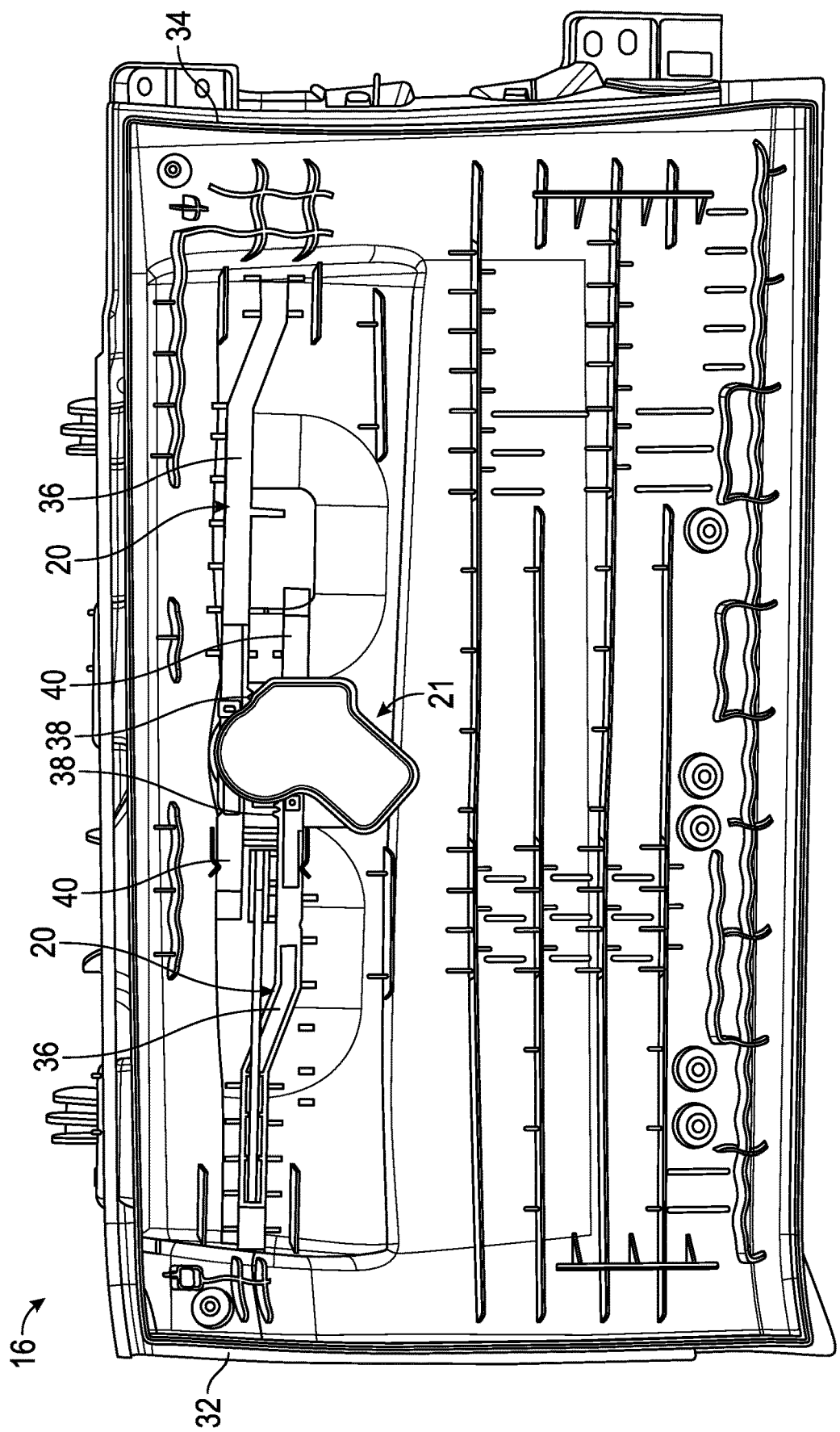
FIG. 2 is a front view of a glove box lid including an actuation system according to an embodiment.

Referring now to FIG. 2, an example of a glove box actuation system 18 is shown in more detail. As illustrated, the glove box actuation system 18 is configured not only to remotely open the glove box lid 16, but also to cinch the glove box lid 16 closed. A drive system 21 of the glove box actuation system 18 includes a motor 22 and a worm gear 24 driven by the worm 26 mounted to the motor shaft 28. In an embodiment, the motor 22 is operated in response to a receipt of a signal, operation of a switch, or other equivalent means. The worm gear 24 is rotatably mounted at a center of the lid 16 or any other suitable location. A pinion 30 (see FIG. 4) is arranged coaxially with the worm gear 24 such that rotation of the worm gear 24 about an axis X causes a similar rotation of the pinion 30 about the axis X. The worm gear 24 and the pinion 30 may be integrally formed, or may be separate components. Although the drive system 21 is illustrated and described herein as being positioned in the lid 16, embodiments where the drive system 2.1 is disposed at another location, such as within the glove box housing 12 are also within the scope of the disclosure. In such embodiments, the drive system 21 may include extended arms configured to cooperate with the remainder of the actuation system 18.

The actuation system 18 additionally includes a first rack 20 extending from adjacent the drive system 21 to a first side 32 of the lid 16 and a second rack 20 extending from adjacent the drive system 21 to a second, opposite side 34 of the lid 16. In an embodiment, the first rack 20 and the second rack 20 are substantially identical, and are located on opposing sides of the drive system 21. Although two racks 20 are illustrated and described herein, it should be understood that embodiments having only a single rack are also within the scope of the disclosure. Each rack 20 includes an elongated body 36 having a plurality of teeth 38 arranged adjacent a first end 40. The pinion 30 is arranged in meshing engagement with the teeth 38 such that rotation of the pinion 30 about its axis X results in a translation of the racks 20 along an axis oriented generally perpendicular to the axis of rotation X. A gear reduction may be provided through engagement between the worm 26, worm gear 24, pinion 30, and rack teeth 38 such that an appropriate amount of power of the motor 22 is used to translate the racks 20.

Figure 3:
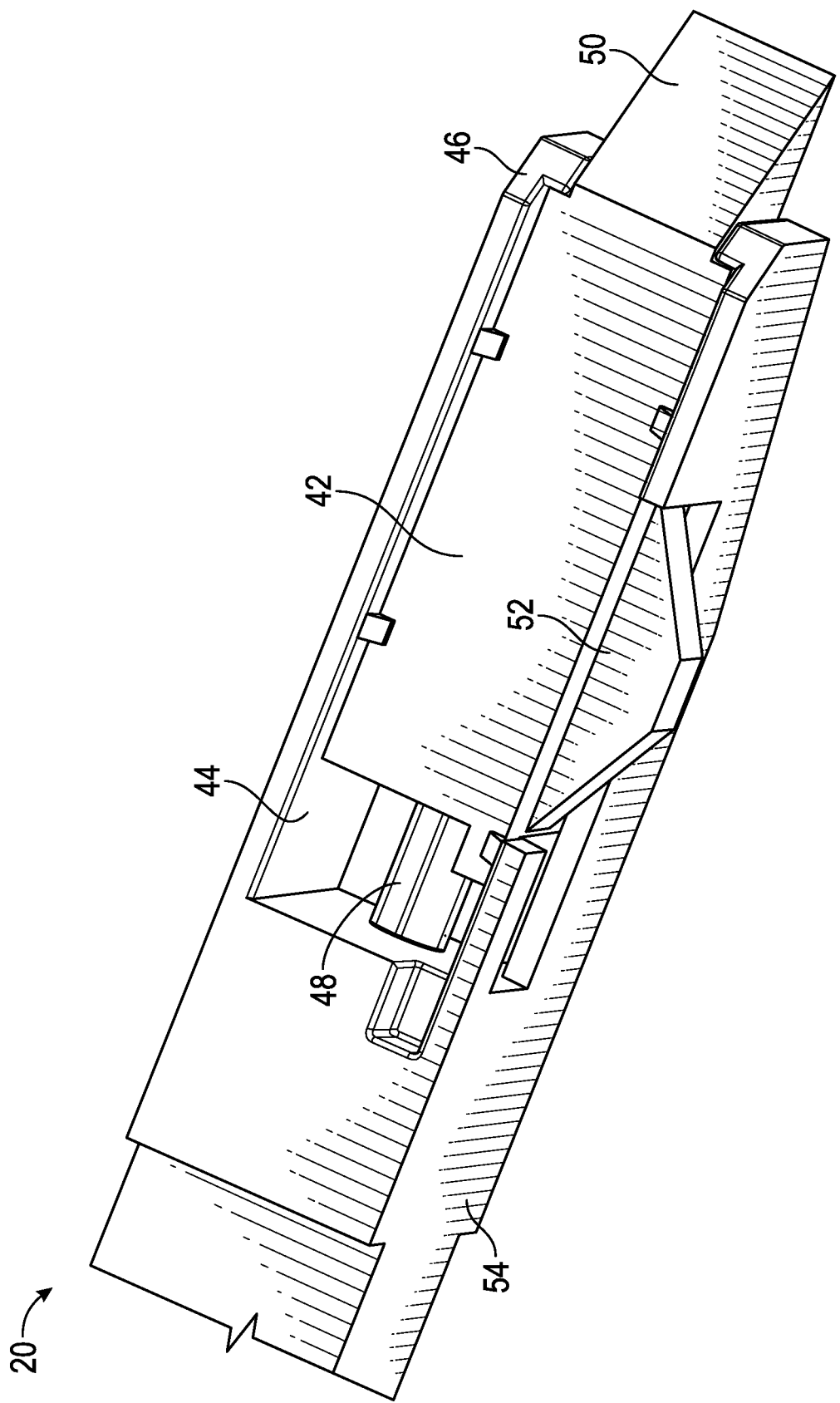
FIG. 3 is a perspective view of a rack including a movable rack end according to an embodiment.
Figure 4:
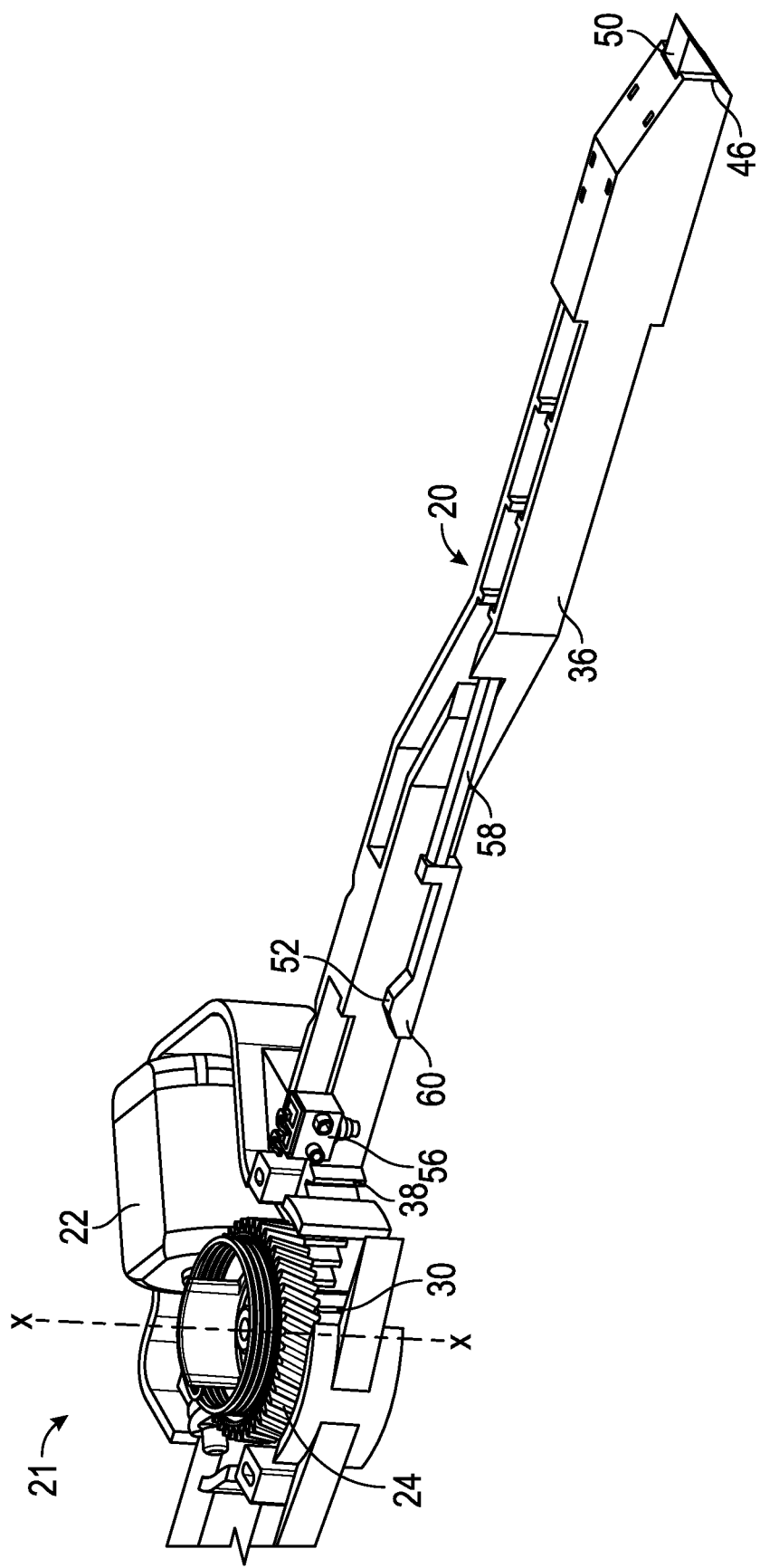
FIG. 4 is a perspective view of another rack including a movable rack end according to an embodiment.

With reference now to FIGS. 3 and 4, the rack 20 is illustrated in more detail. Each rack 20 includes a rack end 42 movably mounted within a cavity 44 formed at the second, opposite end 46 of the rack 20. A biasing mechanism 48, such as a coil spring for example, is arranged within the cavity 44 and is configured to bias the rack end 42 outwardly, towards a corresponding side 32, 34 of the lid 16, for engagement with the housing 12. When the rack end 42 is in its biased position, a portion 50 of the rack end 42 extends beyond the end 46 of the rack body 36. The portion 50 of the rack end 42 may have an angled contour configured to cooperate with the housing 12. In an embodiment, best shown in FIG. 3, the rack end 42 has an engagement feature 52, such as a ramp-like surface for example, protruding from a side thereof, beyond the sidewall 54 of the rack body 36. The engagement feature 52 is configured to contact and activate a rack end switch 56 to indicate a position of the rack 20. In another embodiment, best shown in FIG. 4, the rack 20 additionally includes a link 58 coupled to the movable rack end 42. In such embodiments, the engagement feature 52 for activating the rack end switch 56 is located on the link 58, such as at a distal end 60 for example.

Figure 5:
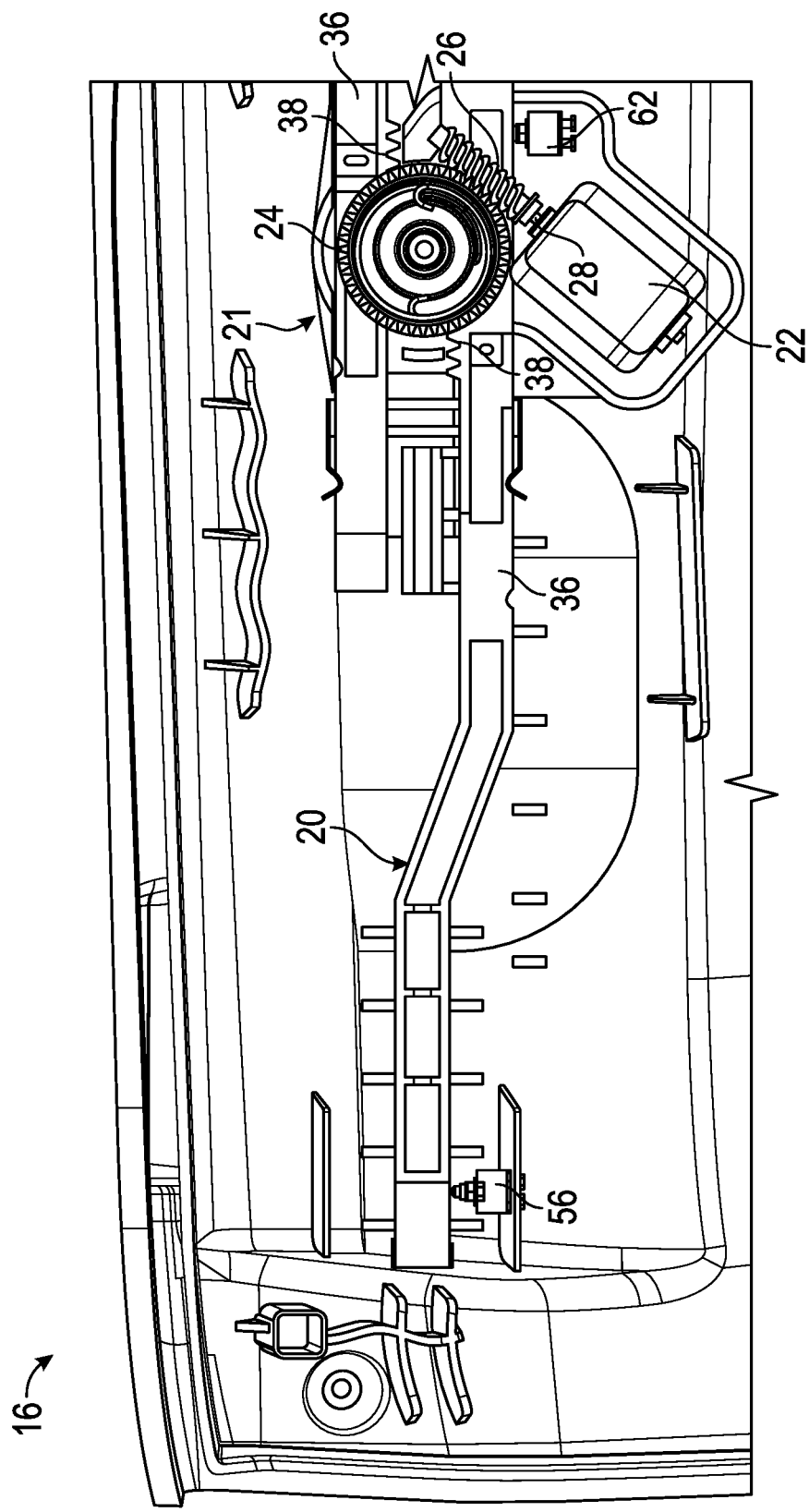
FIG. 5 is a front view of a portion of the glove box lid including an actuation system according to an embodiment.
Figure 6:
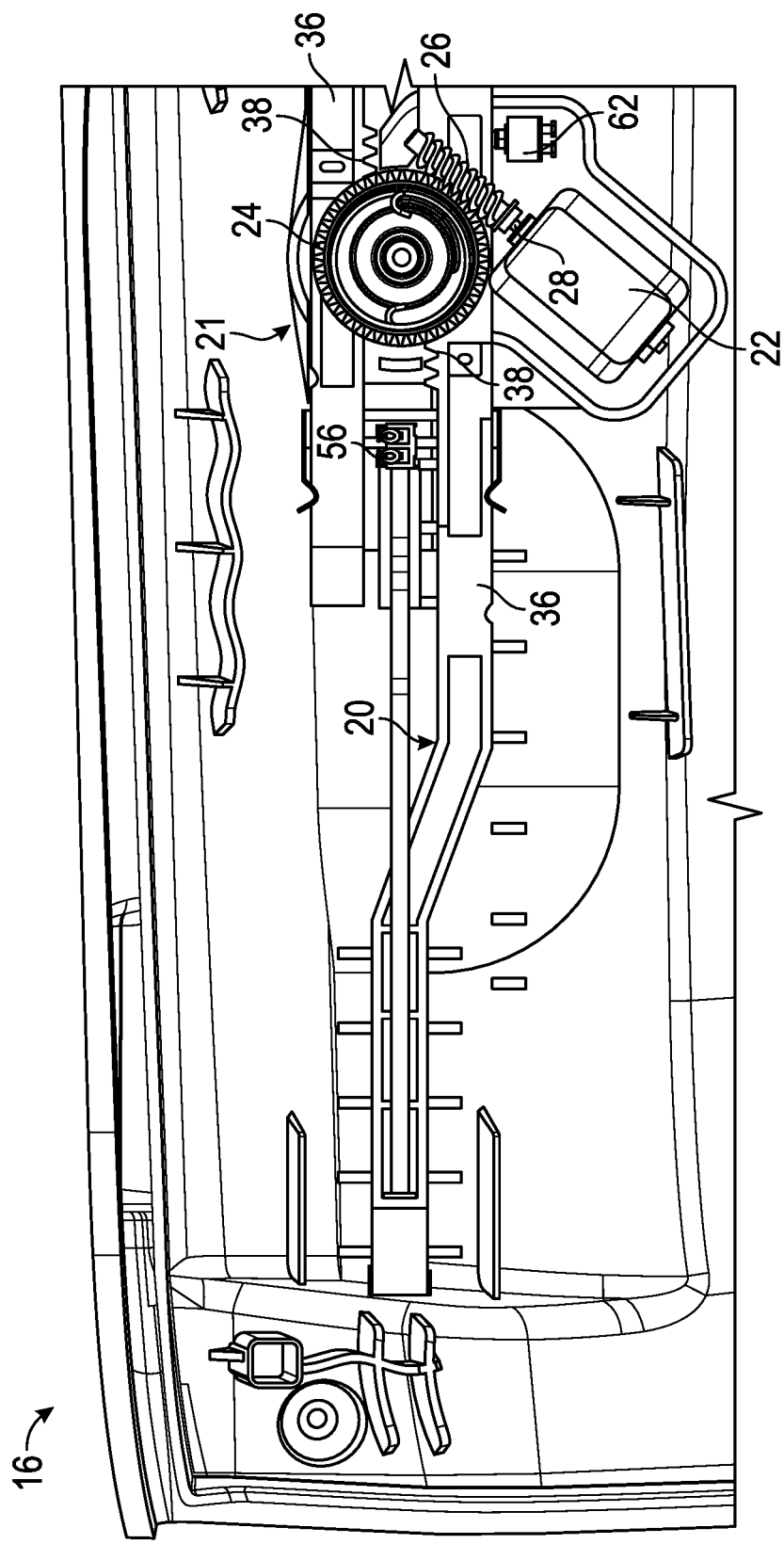
FIG. 6 is a front view of a portion of the glove box lid including an actuation system according to another embodiment.
Figure 7:
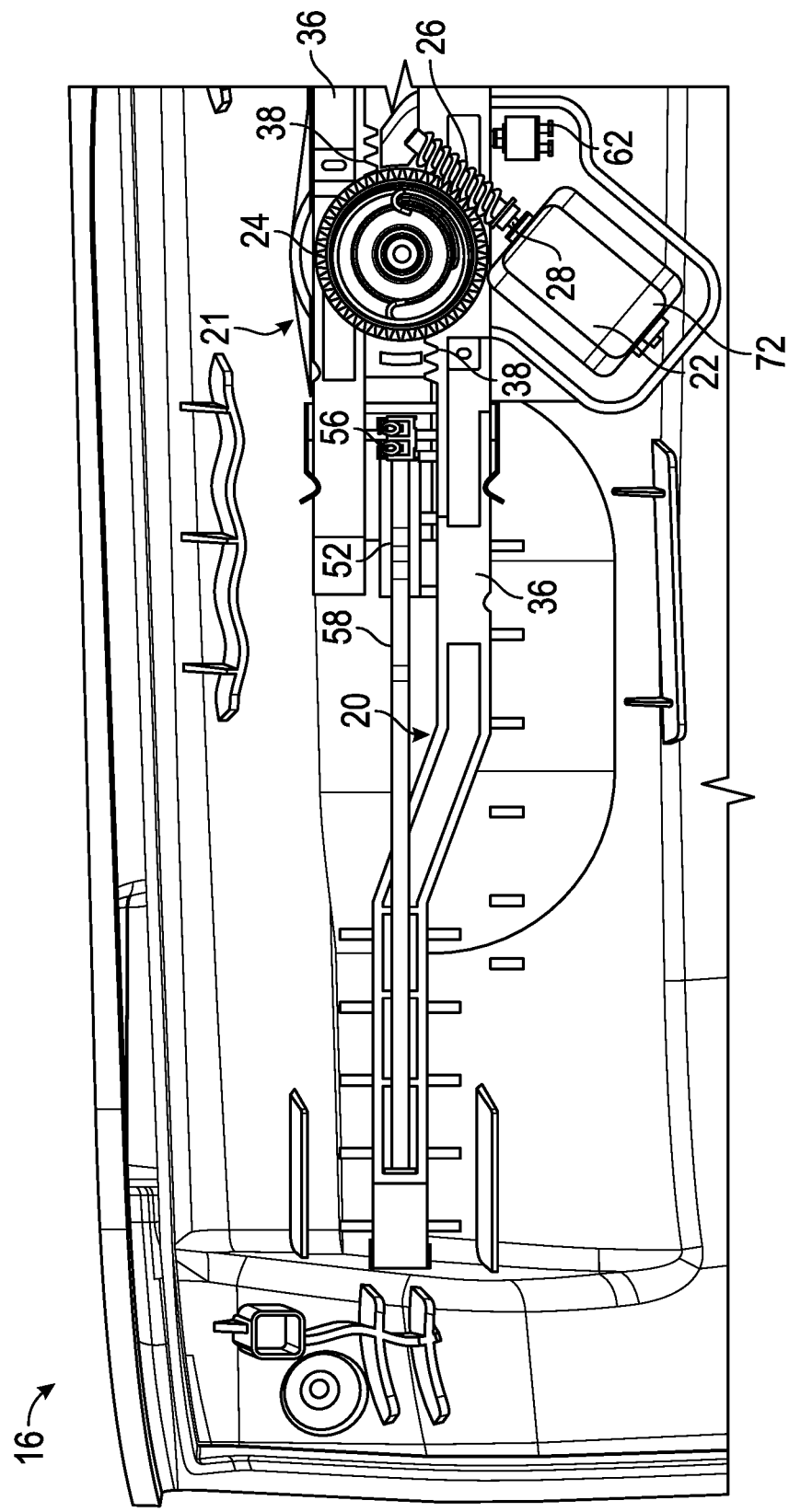
FIG. 7 is a front view of a portion of the glove box lid in a closed position according to an embodiment.
Figure 8:
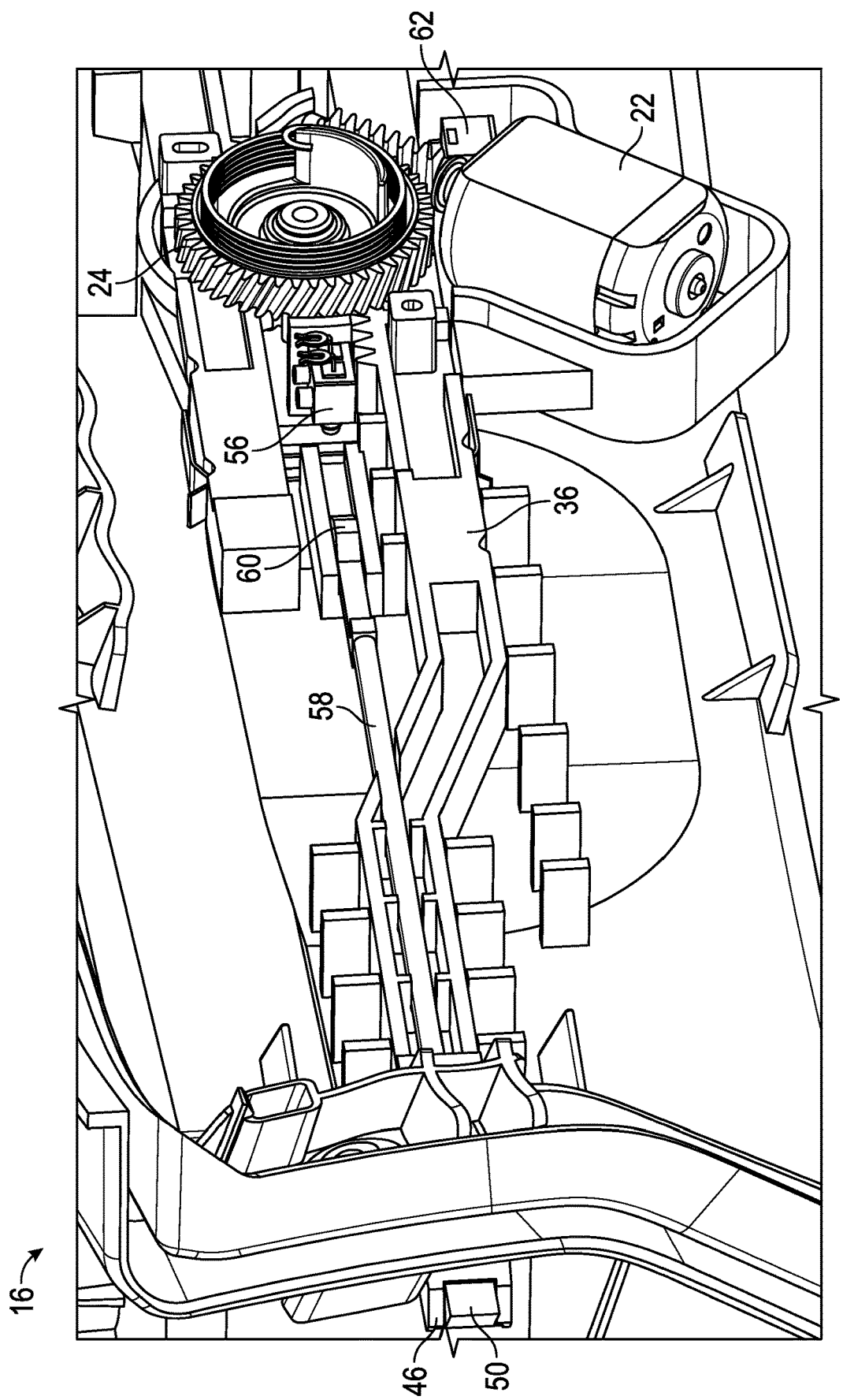
FIG. 8 is a perspective front view of a portion of the glove box lid in a closed position according to an embodiment.
Figure 9:
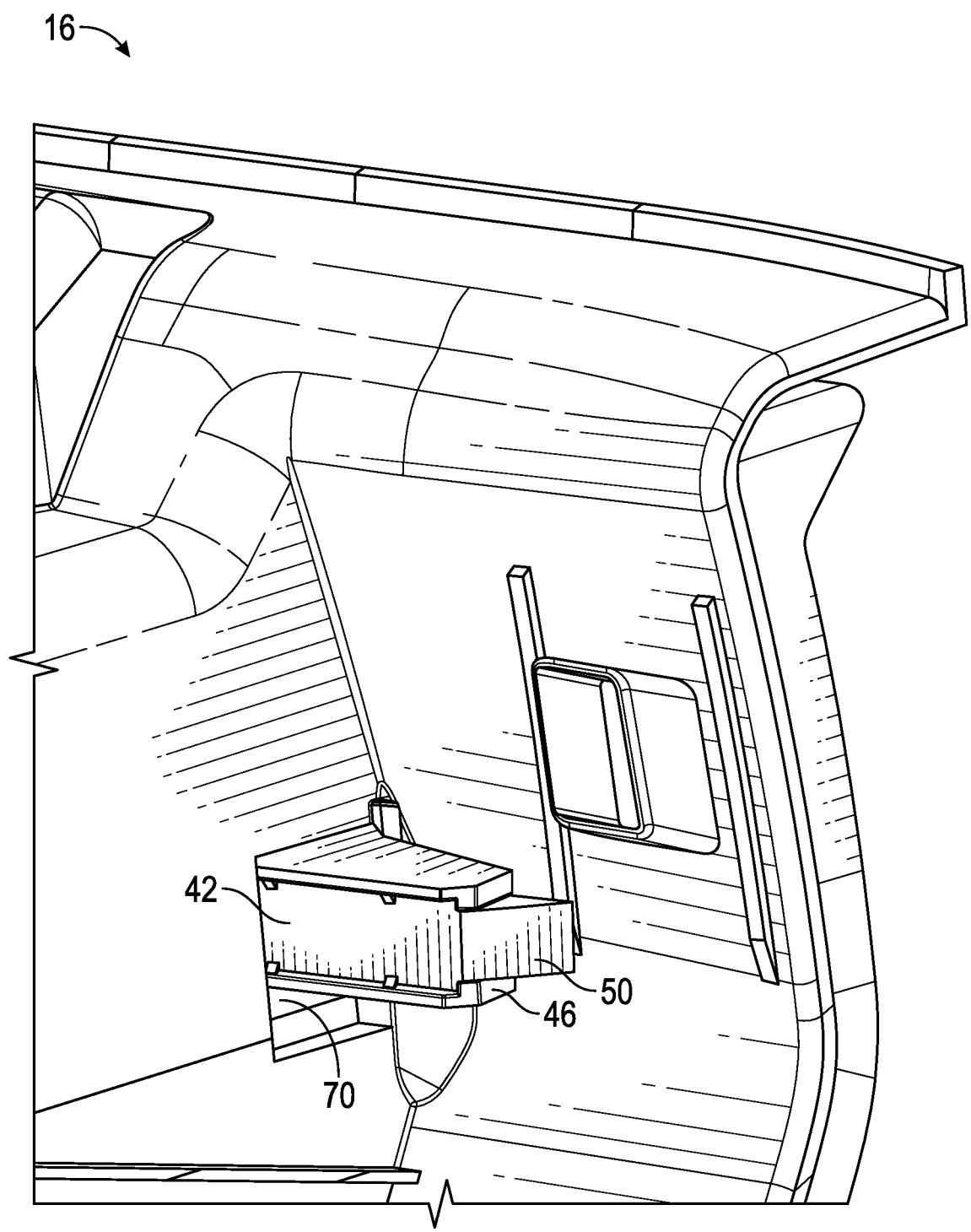
FIG. 9 is a perspective back view of a portion of the glove box lid in a closed position according to an embodiment.
Figure 10:
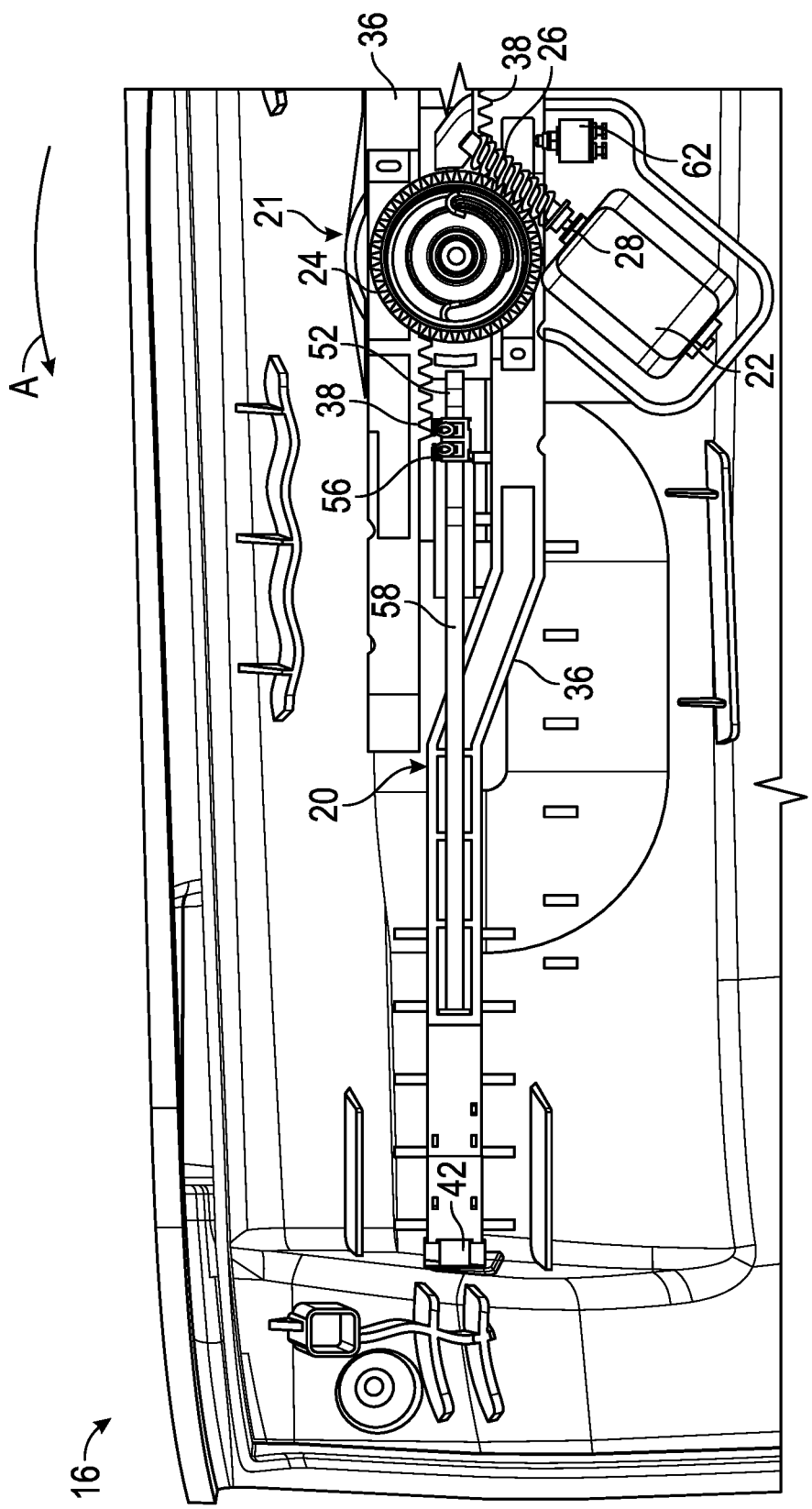
FIG. 10 is a front view of a portion of the glove box lid in an open position according to an embodiment.
Figure 11:
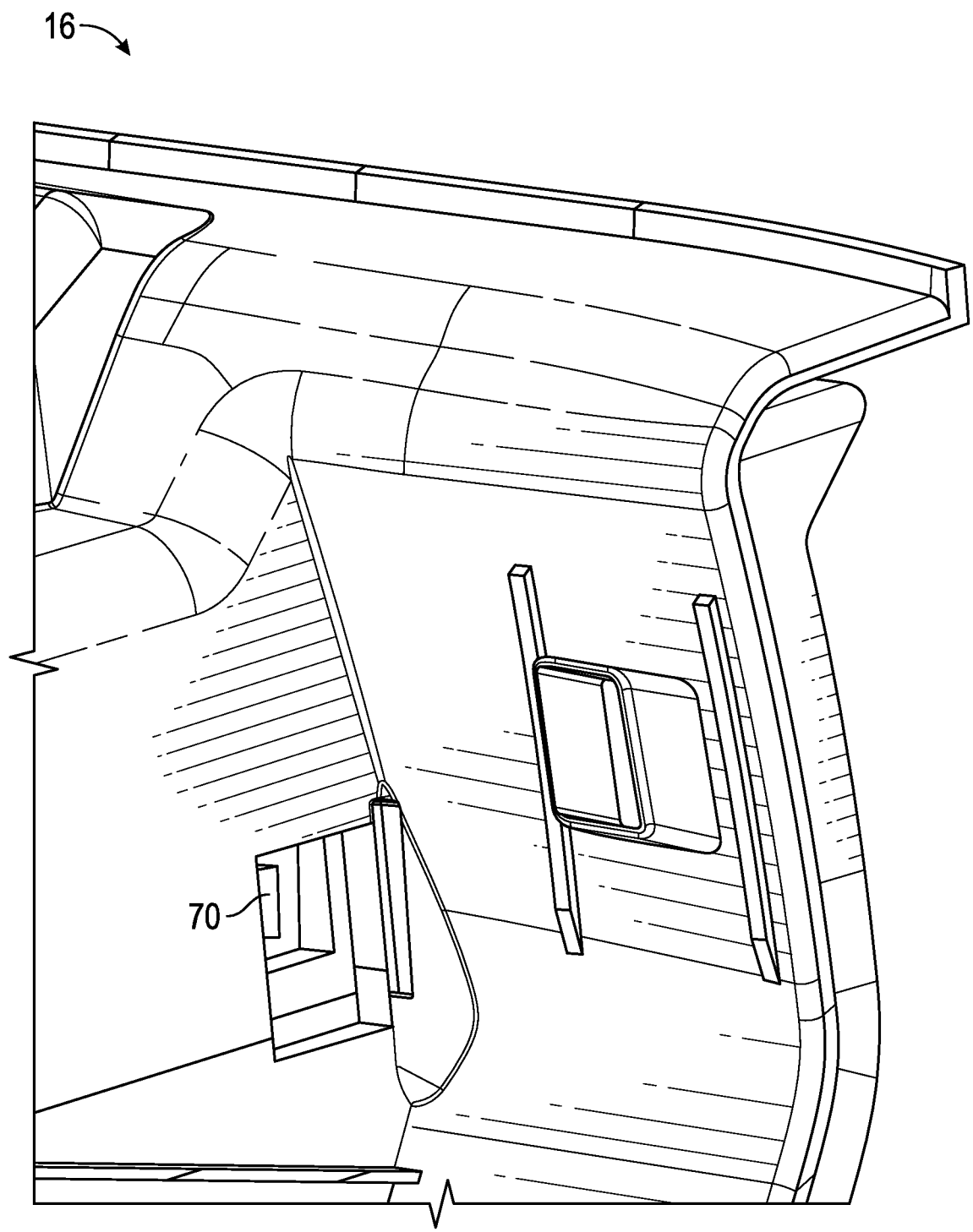
FIG. 11 is a perspective back view of a portion of the glove box lid in an open position according to an embodiment.

The glove box actuation system 18 additionally includes a plurality of switches for monitoring a position of the one or more racks 20 and rack end 42 to determine a status of the glove box lid 16. As previously described, the system 18 includes a rack end switch 56 for monitoring each rack end 42. If the engagement feature 52 is located at the rack end 42, the rack end switch 56 is located near a side 32, 34 of the lid 16, as shown in FIG. 5. Alternatively, when the engagement feature 52 is located on the link 58 extending from the rack end 42, the rack end switch 56 is located at the center of the lid 16, near the pinion 30. The system 18 additionally includes a rack switch 62 configured to contact the first end 40 of the rack 20 when the glove box lid 16, and therefore the rack 20, is not in the closed position.

With reference now to FIGS. 7-14, operation of the glove box actuation system 18 is illustrated and described in more detail. When the lid 16 and therefore the racks 20 are in the closed position (FIGS. 7-9), the second end 46 of each rack 20 and the rack end 42 extends through an opening 70 formed in the lid 16 for engagement with the housing 12. To open the glove box lid 16 relative to the housing 12 and access the compartment 14, a signal is provided to the motor 22 from another switch, illustrated schematically at 72, or other equivalent means. In an embodiment, the switch 72 may be located remotely from the glove box assembly 10. In response to the signal, the motor 22 rotates the pinion 30 in a first direction, indicated by arrow A, causing the racks 20 to translate inwardly and out of engagement with the housing 12. In the open position, shown in FIGS. 10 and 11, no portion of the rack 20 or rack end 42 extends through the opening 70 of the lid 16. As the racks 20 move from the closed position toward the open position, the body 36 of the rack 20 contacts and activates the rack switch 62 to indicate that the rack 20, and therefore the lid 16 is not in the closed position. Operation of the motor 22 may cease in response to activation of the rack switch 62.

A biasing member (not shown), such as a torsion spring for example, may be coupled to the worm gear 24 and/or pinion 30. As the worm gear 24 and pinion 30 rotate to translate the racks 20 inwardly to the open position, a load is applied to the biasing member. Once the racks 20 have reached the open position and the motor 22 is de-energized, the loading of the biasing mechanism is released, causing the pinion 30 to rotate in an opposite direction. This limited rotation resulting from the biasing force of the biasing mechanism moves the racks 20 to a "pre-closed" position, shown in FIGS. 12 and 13. In an embodiment, the pre-closed position of the racks 20 is defined between the open position and the closed position of the rack 20.

Figure 15B:
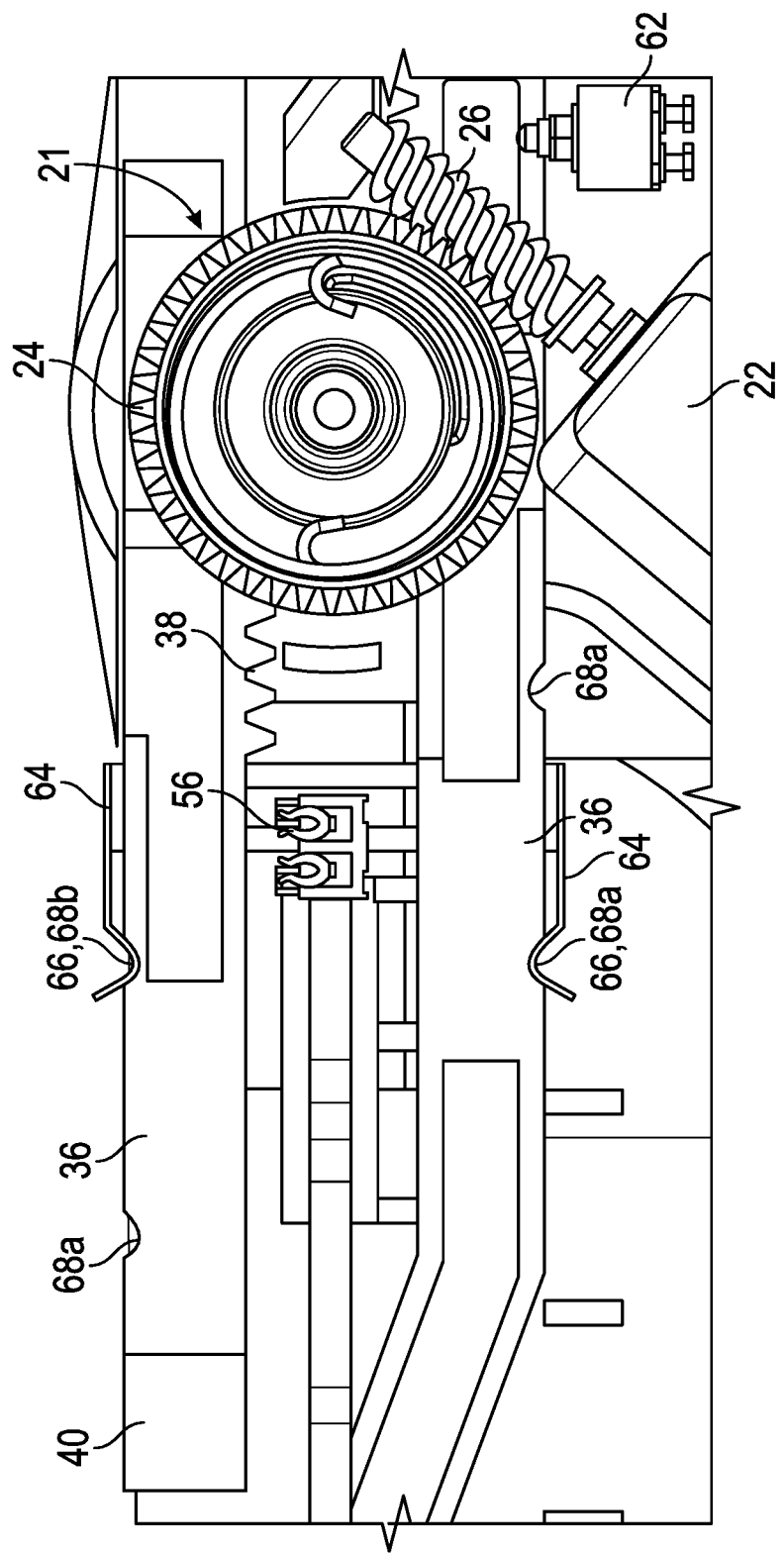

In an embodiment, best shown in FIGS. 15A and 15B, the drive system 21 additionally includes an indexing spring 64 having a feature 66, such as a hook for example, generally complementary to one or more cavities 68 formed in the rack 20. In an embodiment, each rack 20 has a first cavity 68a and a second cavity 68b, associated with the closed position and the pre-closed position, respectively. The indexing spring 64 is configured to counter balance the biasing mechanism coupled to the worm gear 24 or pinion 30, to correctly position and stop the rack 20 in the closed position (FIG. 15A) or in a pre-closed position (FIG. 15B). Alternatively, or in addition, the indexing spring 64 may limit movement, such as rattling of the racks 20 while the rack end 42 is loaded by the biasing mechanism 48.

Figure 12:
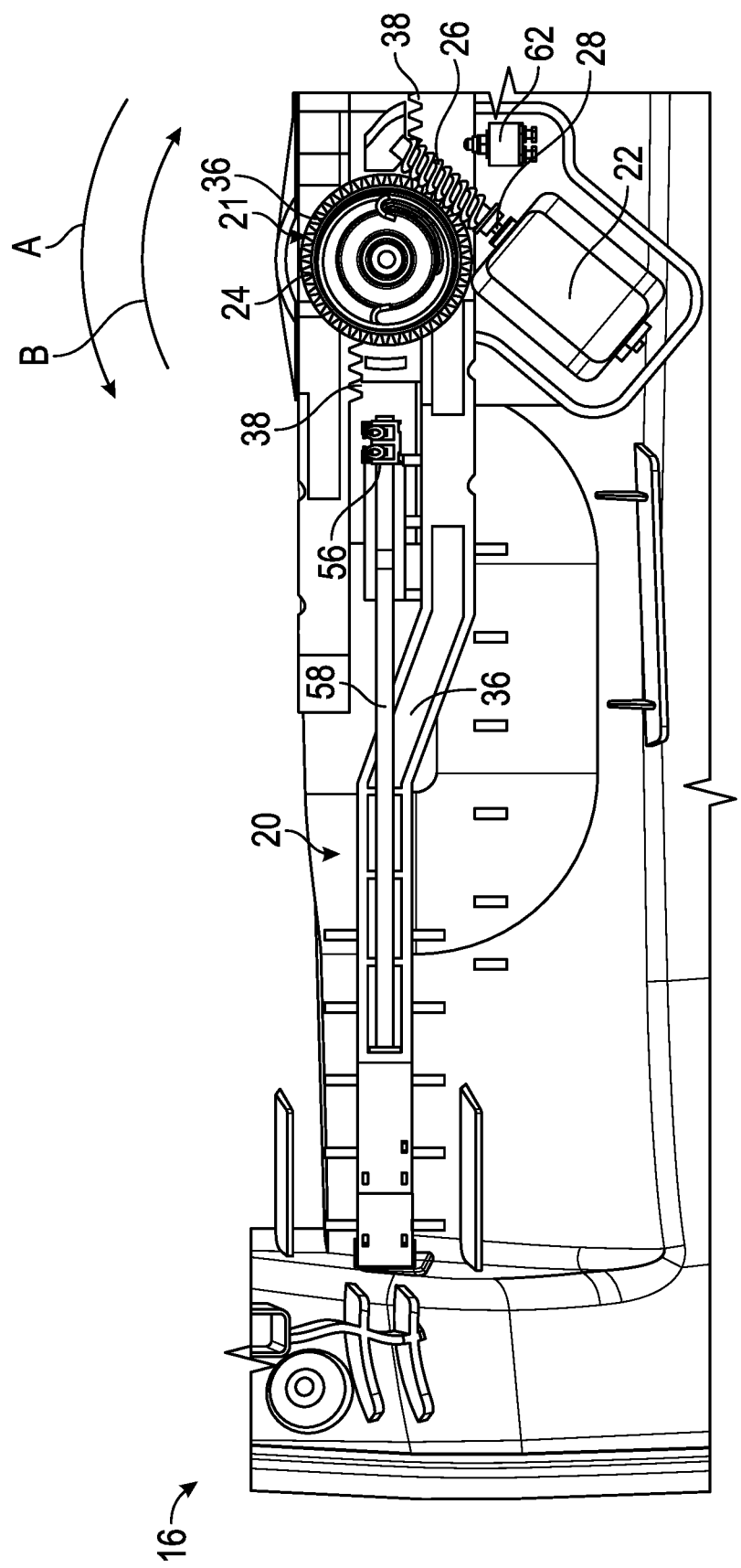
FIG. 12 is a front view of a portion of the glove box lid in a pre-closed position according to an embodiment.
Figure 13:
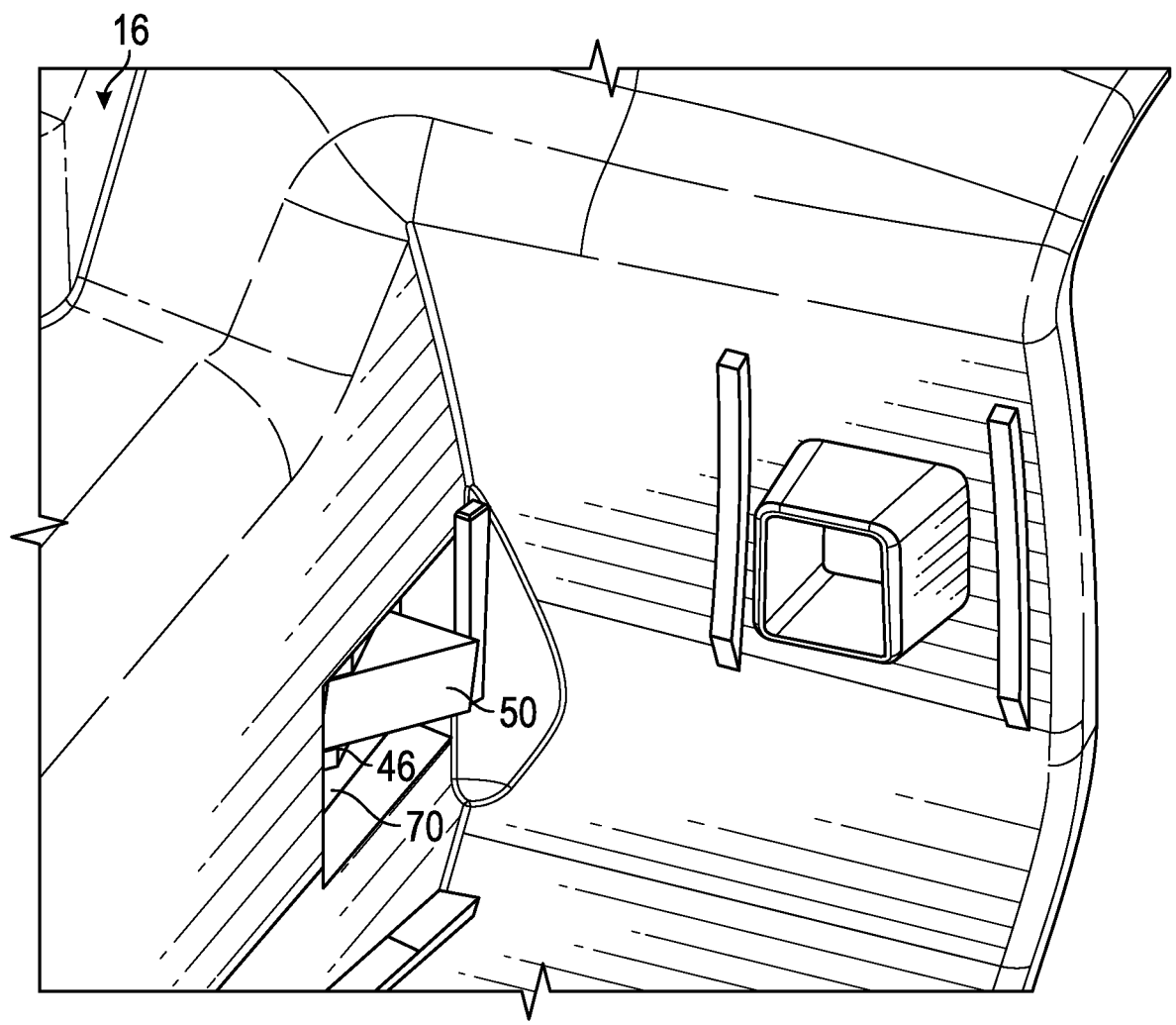
FIG. 13 is a perspective back view of a portion of the glove box lid in a pre-closed position according to an embodiment.
Figure 14:
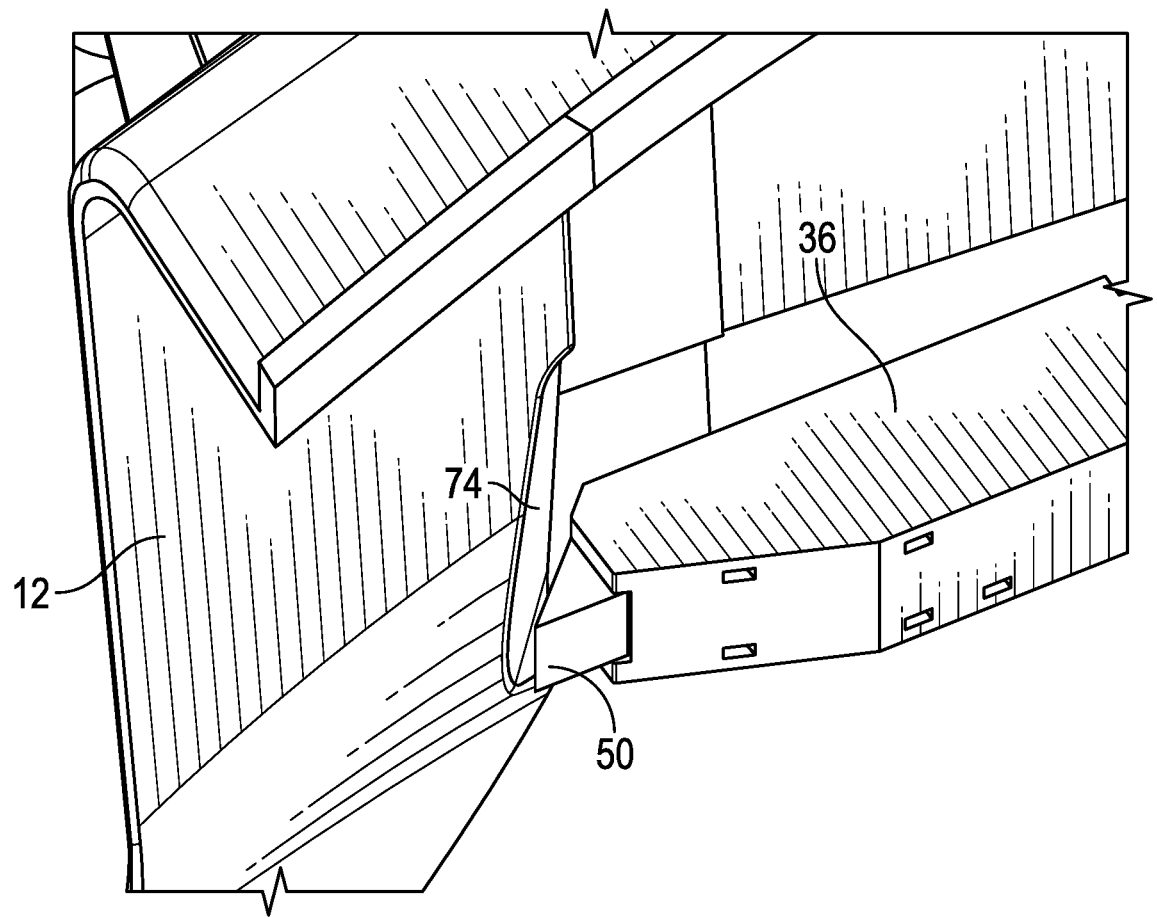
FIG. 14 is a perspective view of a glove box lid and a housing as the glove box lid is moved to a pre-closed position relative to the housing according to an embodiment.

In the pre-closed position, shown in FIGS. 12 and 13, a limited portion of the rack end 42, such as portion 50 for example, extends through the opening 64, at the side 32, 34 of the lid 16. As the lid 16 is rotated towards the housing 12 to a pre-closed position to seal the compartment 14, the rack end 42 engages a ramp-like surface (see FIG. 14) on the housing 12, causing the movable rack end 42 to retract and the biasing mechanism 48 to compress. With further rotation of the lid 16 towards the pre-closed positon, the force applied to the movable rack end 42 is removed, and the biasing force of the biasing mechanism 48 causes the rack end 42 to return to a default extended position. This inward movement of the rack end 42, causes the engagement feature 52 associated with the rack end 42 to translate and briefly activate the corresponding rack end switch 56, thereby indicating that the lid 16 is in the pre-closed position relative to the housing 12. In response to this quick transition of the rack end switch 56 from a deactivated state to an activated state, back to a deactivated state resulting from the engagement of the rack end 42 with the surface 74 of the housing 12, a signal is communicated to the motor 22 causing the worm gear 24 and pinion 30 to rotate in a second direction, indicated by arrow B. Rotation in the second direction is configured to move the racks outwardly from the pre-closed position to the closed position.

If the rack end switch 56 does not indicate the sequence of deactivated, activated, and deactivated within a time threshold, the lid 16 is not in a proper pre-closed position relative to the housing 12. Accordingly, the system 18 will automatically reopen the lid 16 in order to try to close the lid properly.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actuation system of a glove box assembly comprising:
   a drive system;
   at least one rack driven by the drive system between a closed position, an open position, and a pre-closed position, the at least one rack including a rack end movably mounted to a distal end of the at least one rack; and
   at least one switch for sensing a position of the at least one rack, wherein the drive system is operable in response to a signal output by the at least one switch.

2. The actuation system of claim 1, wherein the at least one switch includes a first switch for determining if the at least one rack is not in the closed position and a second switch for detecting when the glove box assembly is in the pre-closed position.

3. A glove box assembly comprising:
   a housing defining a compartment;
   a lid movably coupled to the housing to selectively seal the compartment; and an actuation system associated with the lid, wherein the actuation system is operable to automatically cinch the lid closed when the lid is in a pre-closed position relative to the housing, wherein the actuation system includes:
- at least one rack being movable relative to the lid to selectively engage the housing; and
- at least one switch for determining a position of the lid relative to the housing, the at least one switch being operable to monitor a position of the at least one rack to determine when the lid is in a closed position.

4. The glove box assembly of claim 3, wherein the actuation system further comprises:
- a drive system and the at least one rack is connected to the drive system.

5. The glove box assembly of claim 4, wherein the at least one switch is operable to monitor a movement of the at least one rack to determine when the glove box assembly is in the pre-closed position.

6. The glove box assembly of claim 4, wherein the at least one rack further comprises a rack end movably mounted to a distal end of the at least one rack.

7. The glove box assembly of claim 6, further comprising a biasing mechanism coupled to the rack end to bias the rack end toward the housing.

8. The glove box assembly of claim 6, further comprising an engagement feature associated with the rack end, wherein the at least one switch is activatable by the engagement feature.

9. A method of closing a glove box lid, comprising:
- manually rotating a glove box lid to a pre-closed position relative to a housing;
- activating a switch of a glove box actuation system associated with the glove box lid; and
- automatically translating at least one rack of the glove box actuation system from a pre-closed position to a closed position in response to activating the switch, wherein in the closed position, the at least one rack extending from the glove box lid is engaged with the housing.

10. The method of claim 9, wherein manually rotating the glove box lid selectively opposes a biasing force acting on a rack end mounted to the at least one rack.

11. The method of claim 9, wherein selectively opposing the biasing force acting on the rack end sequentially activates and deactivates the switch.

12. The method of claim 9, wherein activating the switch further comprises communicating an output signal from the switch to a drive system coupled to the at least one rack.

13. The method of claim 9, further comprising automatically translating the at least one rack from a closed position to an open position in response to activation of another switch.

14. The method of claim 13, wherein automatically translating the at least one rack from a closed position to an open position causes the glove box lid to move open relative to the housing.

15. The method of claim 13, wherein when the at least one rack is in the open position, a biasing force biases the at least one rack to a pre-closed position.

16. The method of claim 9, wherein at least a portion of the glove box actuation system is located separate from the glove box lid.

17. The actuation system of claim 1, further comprising an engagement feature associated with the rack end, wherein the at least one switch is activatable by the engagement feature.

18. The actuation system of claim 17, wherein the engagement feature extends from the rack end.

19. The actuation system of claim 17, wherein the at least one rack further comprises a link coupled to the rack end, the engagement feature being formed on the link.

* * * * *